(12) United States Patent
Kom

(10) Patent No.: US 12,316,788 B1
(45) Date of Patent: May 27, 2025

(54) SYSTEM AND METHOD FOR OPERATING COMPUTERS

(71) Applicant: Core Scientific Operating Company, Bellevue, WA (US)

(72) Inventor: Lawrence Kom, Redmond, WA (US)

(73) Assignee: Core Scientific, Inc., Austin, TX (US)

( * ) Notice: Subject to any disclaimer, the term of this patent is extended or adjusted under 35 U.S.C. 154(b) by 385 days.

(21) Appl. No.: 17/737,505

(22) Filed: May 5, 2022

Related U.S. Application Data

(60) Provisional application No. 63/185,705, filed on May 7, 2021.

(51) Int. Cl.
*H04L 9/00* (2022.01)
*H04L 9/32* (2006.01)
*H04L 9/40* (2022.01)

(52) U.S. Cl.
CPC .............. *H04L 9/50* (2022.05); *H04L 9/3236* (2013.01); *H04L 63/0281* (2013.01); *H04L 2209/56* (2013.01)

(58) Field of Classification Search
CPC ..... H04L 9/50; H04L 9/3236; H04L 63/0281; H04L 2209/56
See application file for complete search history.

(56) References Cited

U.S. PATENT DOCUMENTS

| | | | |
|---|---|---|---|
| 2010/0232793 A1* | 9/2010 | Atkinson | H04L 49/602 370/386 |
| 2015/0365412 A1* | 12/2015 | Innes | H04L 63/12 726/7 |
| 2017/0169426 A1* | 6/2017 | Warner | G06Q 20/409 |
| 2020/0012579 A1* | 1/2020 | Anokhin | G06Q 20/02 |

OTHER PUBLICATIONS

Hardening Stratum, the Bitcoin Pool Mining Protocol (Year: 2017).*
Recabarren, Ruben, and Bogdan Carbunar. "Hardening stratum, the bitcoin pool mining protocol." arXiv preprint arXiv:1703.06545 (2017). (Year: 2017).*

* cited by examiner

*Primary Examiner* — Syed M Ahsan
(74) *Attorney, Agent, or Firm* — Fishman Stewart PLLC

(57) ABSTRACT

A method of operating computers may include connecting a computer with a proxy computer; obtaining, via the proxy computer, a list of pools compatible with the computer; selecting a pool from the list of pools; obtaining a header for the selected pool; providing, via the proxy computer, the header to the computer; authenticating the computer with a pool computer; performing compute tasks, via the computer, corresponding to the selected pool; and/or submitting output information from the compute tasks to the pool computer.

20 Claims, 2 Drawing Sheets

SYSTEM AND METHOD FOR OPERATING COMPUTERS

CROSS-REFERENCE TO RELATED APPLICATION

This application claims the benefit of and priority to U.S. Provisional Patent Application Ser. No. 63/185,705, filed on May 7, 2021, the disclosure of which is hereby incorporated by reference in its entirety as though fully set forth herein.

TECHNICAL FIELD

The present disclosure generally relates to computer systems and methods, including computer systems and methods that may, for example, be utilized in connection with cryptocurrency mining and cryptocurrency mining computers, which may be referred to as miners or cryptocurrency miners.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transactions into a ledger (the "blockchain") and rendered immutable (e.g., practically unmodifiable) by including a hash. The hash is a number that is calculated based on the blocks and that meets the blockchain's particular criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to add false information to the blockchain and/or to double spend a digital coin.

Cryptocurrency networks generally consist of many participants that repeatedly attempt to be the first to calculate a hash meeting the blockchain network's requirements. They receive a reward (e.g., a coin reward or transaction fee reward) that motivates them to continue participating (mining).

Many blockchain networks require computationally difficult problems to be solved as part of the hash calculation. The difficult problem requires a solution that is a piece of data which is difficult (costly, time-consuming) to produce but easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network typically operate computers called mining rigs or miners. Because of the difficulty involved and the amount of computation required, the miners are typically configured with specialized components that improve the speed at which hashes or other calculations required for the blockchain network are performed. Examples of specialized components include application specific integrated circuits (ASICs), field programmable gate arrays (FPGA), graphics processing units (GPUs), and accelerated processing unit (APUs).

Miners are often run for long periods of time at high frequencies that generate large amounts of heat. Even with cooling (e.g., high speed fans), the heat and constant operations can negatively impact the reliability and longevity of the components in the miner. ASIC miners, for example, often have large numbers of hashing chips (e.g., 100's) that are more likely to fail as temperatures rise.

Many participants in blockchain networks operate large numbers (e.g., 100's, 1000's or more) of different computers/miners (e.g., different generations of miners from one manufacturer or different manufacturers) concurrently. These large numbers of miners can be difficult to manage. In some configurations, miners and/or other computers participating in blockchain computations/transactions may utilize communication protocols that may result in inefficient operation.

There is a desire for solutions/options that minimize or eliminate one or more challenges or shortcomings of computer systems and methods. The foregoing discussion is intended only to illustrate examples of the present field and is not a disavowal of scope.

SUMMARY

In embodiments, a method of operating computers may include connecting a computer with a proxy computer; obtaining, via the proxy computer, a list of pools compatible with the computer; selecting a pool from the list of pools; obtaining a header for the selected pool; providing, via the proxy computer, the header to the computer; authenticating the computer with a pool computer; performing compute tasks, via the computer, corresponding to the selected pool; and/or submitting output information from the compute tasks to the pool computer.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
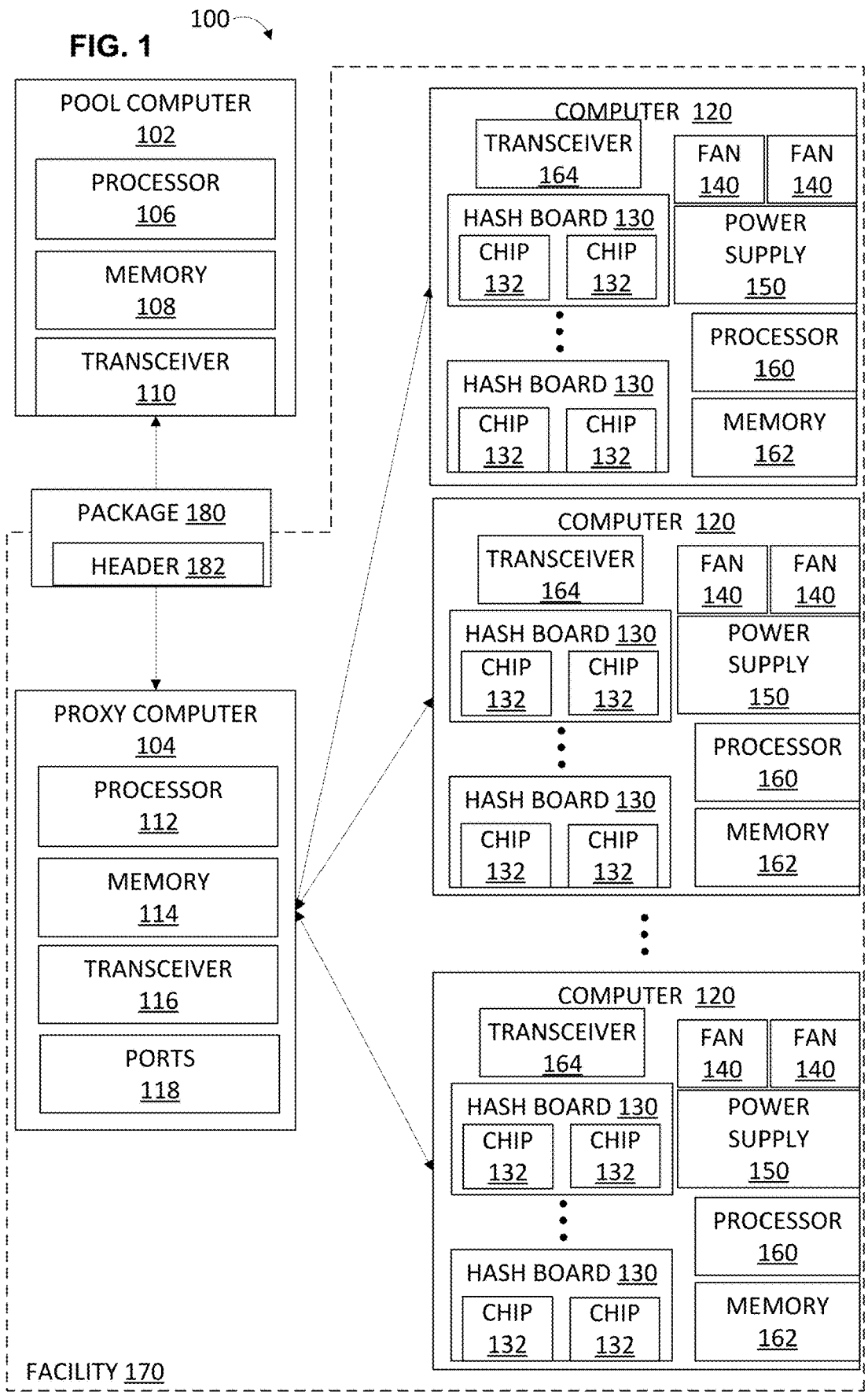
FIG. 1 is schematic view generally illustrating an example embodiment of a computing system according to an exemplary teaching of the present disclosure.

In embodiments, such as generally illustrated in FIG. 1, a computer system 100 may include a pool computer 102, a proxy computer 104, and/or one or more computers 120 (e.g., miners). Pool computer 102 may include a processor 106, a memory 108, and/or a transceiver 110 (e.g., a network interface). Pool computer 102 may, in some circumstances be referred to as a pool manager. Proxy computer 104 may include a processor 112, a memory 114, and/or a transceiver 116 (e.g., a network interface).

With embodiments, a computer 120 may be configured to perform compute tasks, such as compute tasks that may be utilized in connection with a blockchain and/or cryptocurrency mining. For example, a computer 120 may include one or more compute boards like hash boards 130. Processor 160, which may be configured as a controller, may handle communication external to computer 120 (e.g., via a transceiver 164), distribute compute tasks to hash boards 130, and/or receive results from computations from hash boards 130. Hash boards 130 may include one or more computing chips 132. Processor 160 may also be configured to control settings of computer 120 such as setting speeds of fans 140, chip voltage, and/or chip frequency. Some of these settings may be set by processor 160 by communicating with power supply 150 and some of these may be set by processor 160 by communicating with components directly on hash boards 130. Operating instructions for processor 160 may, for example, be stored on a memory 162. A power supply 150 may provide power to some or all components of a computer 120, such as a hash board 130, a fan 140, a processor 160, a memory 162, and/or a transceiver 164.

In one example embodiment, computing chips 132 may include fixed-function application specific integrated circuits (ASICs) that are optimized for efficiently calculating hashes (e.g., SHA256), an operation that may be useful for mining cryptocurrencies like Bitcoin that are based on proof of work (POW). In other embodiments, computing chips 132 may, additionally or alternatively, include graphic processing units (GPUs) or field programmable gate arrays (FPGAs), and processor 160 may also be configured to provide programming information for these more configurable devices (e.g., OpenCL for GPUs and VHDL or Verilog for FPGAs). In some embodiments with FPGAs or GPUs, computers 120 may be configured to perform other types of compute operations, such as image processing, such as part of a machine learning neural network.

Computers 120 need not be of the same type, and in many embodiments may comprise groups of devices of different model types from different manufactures. Dissimilar models provided by disparate manufacturers may be controlled in different ways. Some components of computers 120 may include voltage regulators, buck controllers, and/or MOSFETs, among others, which may be controlled individually by proxy computer 104 (and/or a separate managing computer), such as via respective processors/controllers 160 that may receive instructions from proxy computer 104.

With illustrative embodiments, pool computer 102 may include and/or may distribute a plurality of compute tasks. Pool computer 102 may use a communication protocol that may standardize the manner in which information is distributed and/or received by pool computer 102. The communication protocol may, for example and without limitation, include a Stratum protocol. Pool computer 102 and/or the communication protocol may require authentication of computers 120 that work on the compute tasks. In some configurations, pursuant to the communication protocol, computer 120 may connected to a first socket of pool computer 102 and pool computer 102 may request authentication from a computer 120 by providing a package of information 180 (e.g., an electronic package) with an identifying header 182. Computer 120 may receive the header 182 and utilize the header 182 to provide its authentication information to pool computer 102. In some instances, this authentication process may involve initializing computer 120 with information from the header 182 but after initialization, computer 120 may determine that the package is incompatible with computer 120 and/or authentication may fail. Since computer 120 is already initialized, obtaining a new package (e.g., a compatible package) may involve disconnecting computer 120 from the first socket and reconnecting with a second socket of pool computer 102, and/or resetting computer 120, which may be inefficient.

In illustrative embodiments, proxy computer 104 may be configured to manage and/or control, at least in part, communications between pool computer 102 and computer 120. Proxy computer 104 may include an assigned port 118 (e.g., a virtual communication port) that may include a unique number/address for each computer 120. For a certain computer 120 to obtain compute tasks from pool computer 102, the computer 120 may connect to its assigned port 118 at the unique address. Proxy computer 104 may automatically determine that any computer connecting to that port 118 is the certain computer 120, which may function as a pre-authentication (e.g., the certain computer 120 may pre-authenticate with proxy computer 104 by connecting to its assigned and unique port 118). Proxy computer 104 may include a profile associated with some or each computer 120 (e.g., computer profiles) that may be stored in memory 114. The profile may for example, include compatibility information and/or a list of pools. The list of pools may be user-specified and/or may be a list of compatible pools available from pool computer 102. Proxy computer 104 may associate a computer profile of a computer 120 with the port 118 assigned to the computer 120.

With example embodiments, proxy computer 104 may be configured to search for a pool from the list of pools in pool computer 102. If proxy computer 104 finds a matching pool, proxy computer 104 may obtain/request a header 182 or package 180 corresponding to the matching/compatible pool from pool computer 102. Proxy computer 104 may provide the header 182 and/or the package 180 with the header 182 to computer 120. Computer 120 may utilize the header 182 to generate authentication information for use by pool computer 102. Computer 120 may provide the authentication information to proxy computer 104, and proxy computer 104 may provide the authentication information to pool computer 102. Pool computer 102 may verify the authentication information and/or complete the authentication process. Computer 120 may continue to initialize and may then perform work on the compute tasks and generate an output corresponding to the tasks. The output may, for example, include generate hashes. Computer 120 may be configured to provide the output to proxy computer 104 and/or directly to pool computer 102.

With illustrative embodiments, pre-authenticating computer(s) 120 with proxy computer 104 prior to authenticating with pool computer 102 may improve the operating efficiency of computer 120. For example, computer(s) 120 may not waste computing resources, time, and/or electrical power authenticating for incompatible pools. Additionally or alternatively, pre-authenticating computer(s) 120 with proxy computer 104 may improve operating efficiency of pool computer 102. For example, pool computer 102 may not waste computing resources, time, and/or electrical power authenticating (or starting to authenticate) incompatible computers 120.

In some example embodiments, proxy computer 104 may be configured to manage and/or control communications of a plurality of computers 120 with pool computer 102 (which may include multiple computers). For example and without limitation, proxy computer 104 may be configured to pre-authenticate a plurality of computers 120 (e.g., substantially simultaneously), obtain respective compatible packages/headers 180, 182 for each computer 120, and/or facilitate authentication of the plurality of computers 120 with pool computer 102.

With an illustrative embodiment, proxy computer 104 and computers 120 may be disposed in a common/the same facility 170, such as a data center, warehouse, and/or container, among others. Pool computer 102 may be disposed outside of facility 170. Pool computer 102, proxy computer 104, and/or computer(s) 120 may be separate devices (e.g., in separate housings) that may be connected to communicate with each other, such as via one or more networks (e.g., wired networks, wireless networks, etc.).

Figure 2:
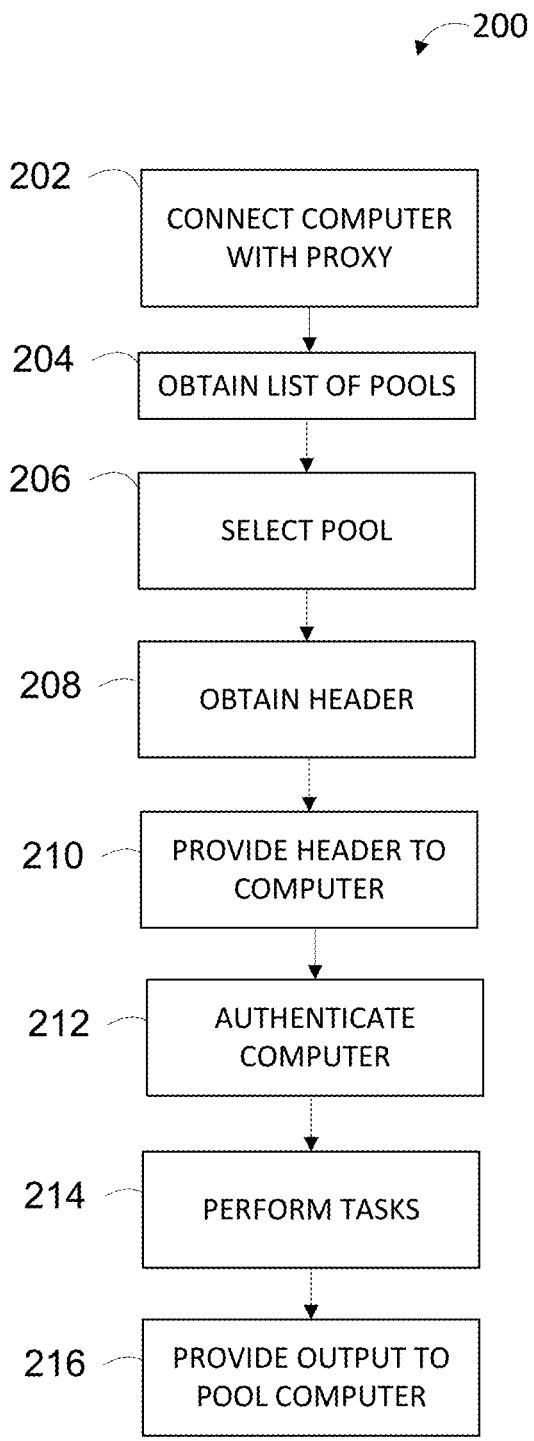
FIG. 2 is flow chart generally illustrating an example embodiment of a method of operating computers of the present disclosure.

Turning to FIG. 2, an example embodiment of a method of computer operation 200 is illustrated. Method 200 may include connecting a computer 120 with a proxy computer 104 (block 202), such as to an assigned port 118 of proxy computer 104, which may pre-authenticate computer 120 with proxy computer 104. Block 202 may include pre-authenticating at least one additional computer 120, which may include connecting each additional computer 120 of the at least one additional computer 120 with a respective assigned port of proxy computer 104. Proxy computer 104 may obtain a list of pools compatible with computer 120 (block 204), such as from a profile associated with computer 120 and/or port 118. Proxy computer 104 may select a pool from pool computer 102 that matches with the list of pools (block 206), may obtain a corresponding package or header 180, 182 for that pool from pool computer 102 (block 208), and/or may provide the package or header 180, 182 to computer 120 (block 210). Computer 120 may utilize information from the header 182 to generate authentication information that computer 120 and/or proxy computer 104 may provide to pool computer 102, which may complete the authentication process (block 212). Computer 120 may then perform compute tasks associated with the package or header 180, 182 and generate corresponding output information (block 214), which may include hashes. Computer 120 may provide the output information to proxy computer 104, which may provide/submit the output information to pool computer 102 (and/or another computer in communication therewith), and/or computer 120 may provide/submit the output information directly to pool computer 102 (step 216). The output information may, in examples, be submitted to the same pool computer 102 and/or another pool computer 102. In some configurations, a first computer of pool computer 102 may distribute compute tasks to computer 120 and/or a second computer of pool computer 102 may receive the output information. Method 200 may increase efficiency of pool computer 102 and/or computer(s) 120, and/or method 200 may be referred to a method of increasing computer operation efficiency.

In examples, a computing device/computer (e.g., computers 102, 104, 120) may include an electronic controller and/or include an electronic processor, such as a programmable microprocessor and/or microcontroller. In embodiments, a computing device/computer may include, for example, an application specific integrated circuit (ASIC). A computing device/computer may include a central processing unit (CPU), a memory (e.g., a non-transitory computer-readable storage medium), and/or an input/output (I/O) interface. A computing device/computer may be configured to perform various functions, including those described in greater detail herein, with appropriate programming instructions and/or code embodied in software, hardware, and/or other medium. In example embodiments, a computing device/computer may include a plurality of controllers. In illustrative embodiments, a computing device/computer may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of operating computers, the method comprising:
   connecting a computer with a proxy computer;
   obtaining, via the proxy computer, a list of pools compatible with the computer;
   selecting a pool from the list of pools;
   obtaining a header for the selected pool;
   providing, via the proxy computer, the header to the computer;
   authenticating the computer with a pool computer;
   performing compute tasks, via the computer, corresponding to the selected pool; and
   submitting output information from the compute tasks.

2. The method of claim 1, wherein authenticating the computer includes:
   obtaining, via the proxy computer, authentication information from the computer; and
   providing, via the proxy computer, the authentication information to the pool computer.

3. The method of claim 1, wherein the pool computer utilizes a Stratum protocol and the output information from the compute tasks is submitted to the pool computer.

4. The method of claim 1, wherein the proxy computer includes a communication port assigned to the computer.

5. The method of claim 4, wherein the list of pools is user-specified and stored in a computer profile; and
   obtaining the list of pools includes obtaining the list of pools from the computer profile.

6. The method of claim 5, including the proxy computer associating the computer profile with the communication port.

7. The method of claim 1, wherein the proxy computer searches for a pool from the list of pools in pool computer.

8. A computing system, comprising:
   a pool computer;
   a proxy computer;
   a plurality of computers configured to conduct compute tasks received from the pool computer; and
   a memory storing a computer profile for each of the plurality of computers, wherein each computer profile includes a list of pools compatible with a respective computer;
   wherein the computing system is configured to:
   connect at least one of the plurality of computers with the proxy computer;
   obtain, via the proxy computer, a list of pools compatible with the at least one computer;
   select a pool from the list of pools;
   obtain a header for the selected pool;
   provide, via the proxy computer, the header to the at least one computer;
   authenticate the computer with the pool computer;
   perform compute tasks, via the at least one computer, corresponding to the selected pool; and
   submit output information from the compute tasks.

9. The computing system of claim 8, wherein the proxy computer is configured to facilitate authentication of the plurality of computers with the pool computer to improve operating efficiency of one or more of the plurality of computers and/or the pool computer.

10. The computing system of claim 8, wherein the plurality of computers are cryptocurrency miners each having a processor, a memory, and one or more hash boards.

11. A method of increasing computer operation efficiency, the method comprising:
    pre-authenticating, via a proxy computer, a computer;
    obtaining, via the proxy computer, a list of pools compatible with the computer;
    selecting a pool from the list of pools;
    obtaining an electronic package for the selected pool from a pool computer, the electronic package having a header;

providing, via the proxy computer, the header to the computer;
authenticating the computer with the pool computer;
performing compute tasks, via the computer, corresponding to the electronic package; and
submitting output information from the compute tasks.

12. The method of claim 11, wherein a connection of the computer to an assigned communication port of the proxy computer functions as pre-authenticating the computer.

13. The method of claim 11, wherein the output information includes hashes.

14. The method of claim 11, wherein the pool computer utilizes a Stratum protocol and the output information is submitted to the pool computer.

15. The method of claim 11, including pre-authenticating at least one additional computer.

16. The method of claim 15, wherein the proxy computer includes an assigned port for the computer and the at least one additional computer;
pre-authenticating the computer includes connecting the computer with its assigned port of the proxy computer; and
pre-authenticating the at least one additional computer includes connecting each additional computer of the at least one additional computer with its respective assigned port of the proxy computer.

17. The method of claim 15, wherein the computer and the at least one additional computer are cryptocurrency miners having one or more hash boards.

18. The method of claim 11, wherein the computer is a cryptocurrency miner having one or more hash boards.

19. The method of claim 11, wherein the list of pools is obtained from a computer profile associated with the computer.

20. The method of claim 19, wherein the list of pools is provided by a user and stored in the computer profile; and the computer profile is stored in a memory of or connected to the proxy computer.

\* \* \* \* \*